Aug. 4, 1953
L. E. RABJOHN
2,647,378
SEAL FOR BEVERAGE COOLERS
Filed Jan. 15, 1951
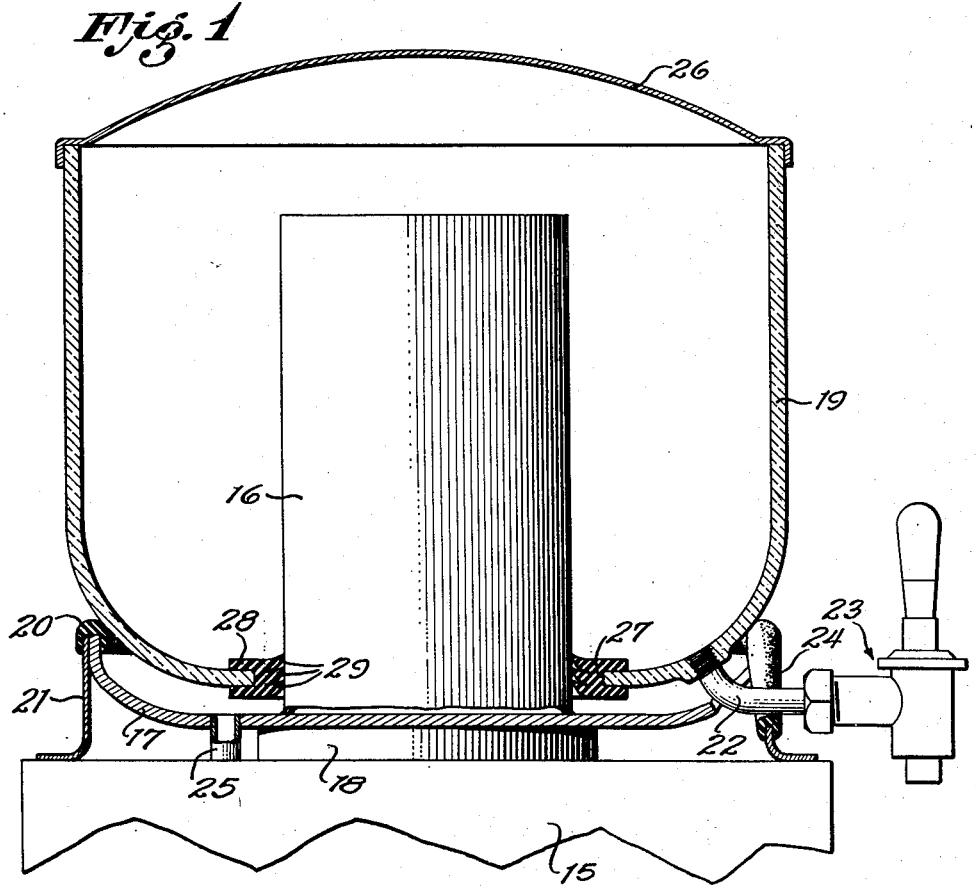
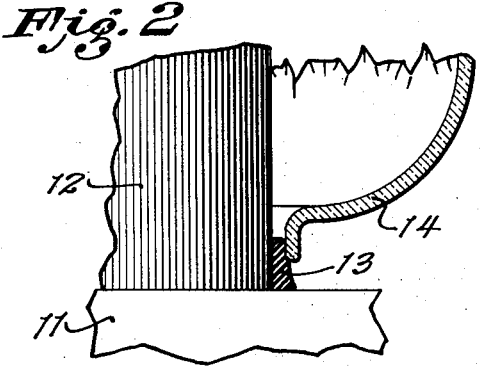
Inventor,
LLOYD E. RABJOHN
By John H. Rouse,
Attorney Patented Aug. 4, 1953

2,647,378

UNITED STATES PATENT OFFICE 2,647,378

SEAL FOR BEVERAGE COOLERS

Lloyd E. Rabjohn, Glendale, Calif.

Application January 15, 1951, Serial No. 206,011

5 Claims. (Cl. 62—142)

This invention relates to apparatus for cooling and dispensing beverages such as fruit juices, and more particularly to such apparatus that includes a bowl-like beverage receptacle and an elongated heat-exchanger projecting through an opening in the bottom of the receptacle; a general object of the invention being to provide means for so joining the receptacle and the heat-exchanger that they can be readily separated for thorough cleaning, a more specific object being to provide improved means for sealing the junction between them.

For full understanding of the invention, and further appreciation of its objects and advantages, reference is to be had to the following detailed description and accompanying drawing, and to the appended claims.

In the drawing:

Figure 1 is a view, mainly in section, of a beverage cooling and dispensing apparatus embodying my invention; and Figure 2 is a fragmentary sectional view of prior-art apparatus, shown only for the purpose of comparison.

Referring first to the prior-art arrangement shown in Fig. 2, the numeral 11 indicates a base from which a cylindrical heat-exchanger or cooler 12 projects. Closely encircling the lower end of cylinder 12 is an annular sealing member 13, of elastic material such as rubber, upon whose tapered side surface the open bottom end of a bowl-like beverage receptacle 14 rests. By this arrangement the weight of the receptacle and its contents maintains the receptacle in engagement with the sealing member, and that member in engagement with the cylinder, so that a liquid-tight seal results. To clean the receptacle after it is emptied, it is simply lifted from the sealing member and removed from the apparatus.

The sealing member 13 should be removed for proper cleaning since the rubber-like material of which it is made retains deposits to a greater degree than do hard smooth-surfaced materials. Furthermore, if the sealing member is not removed, stale beverage will remain in the crevices between it and the cylinder. However, it is difficult to remove the sealing member from the cylinder, which it obviously must fit relatively tightly, and it therefore frequently happens that a careless person will neglect to remove the sealing member, so that the apparatus becomes unsanitary.

To avoid the possibility of the sealing member being left on the heat-exchanger when the apparatus is cleaned, I provide an arrangement wherein the sealing member is so attached to the receptacle that it must be removed therewith from the heat-exchanger.

This arrangement is shown in Fig. 1 wherein the numeral 15 indicates a base containing refrigerating apparatus (not shown) which may be of any conventional type capable of circulating a cooling medium through the interior of a cylindrical metallic heat-exchanger 16 projecting from the base. The cylinder 16 is secured at its bottom, as by welding, to a dish-like member 17 mounted on an extension 18 of the base. Surrounding the cylinder is a bowl-like receptacle 19, of material such as plastic, which rests on a cushioning ring 20 on the rim of dish 17; the ring having a channel in its underside for receiving the top margin of dish 17 and also that of a skirt 21 resting on the base and encompassing the underpart of the dish. Dish 17, skirt 21 and ring 20 are formed to provide a recess for a pipe 22 threaded in an opening through a thickened portion of receptacle 19 and having a faucet 23 at its outer end for dispensing beverage from the receptacle; a portion of the cushioning ring being folded down around the recess, as indicated at 24. In the bottom of the dish is a drain pipe 25; and resting on top of the receptacle is a cover 26.

In the bottom of receptacle 19 is a circular opening, somewhat larger in diameter than cylinder 16, whose edge is indicated at 27. Sealing the space between the cylinder and the edge 27 is an annular member 28, of elastic material such as rubber and whose inner surface is grooved to increase its resilience and to provide a plurality of independent sealing fins 29 with air spaces therebetween. The outer edge of the sealing member is channeled relatively deeply to receive the marginal portion of the receptacle adjoining its edge 27 and therefore cannot be removed from the receptacle while the same is in its normal position around the cylinder, as shown.

It is to be observed that the support provided by dish 17 and ring 20 limits the downward position of the receptacle to one wherein there is a space between the sealing member 28 and the dish, so that any matter which, through carelessness, might be allowed to collect on the dish would not contaminate the beverage in the receptacle.

To clean the apparatus, after the contents of the receptacle have been emptied, the receptacle, together with the sealing member, is simply withdrawn or raised from the cylinder, whereupon the sealing member can readily be detached from the receptacle for thorough cleaning. Any drippings from the cylinder, when the receptacle is removed, are received by dish 17 and drain therefrom through pipe 25.

The lower end of cylinder 16 is preferably slightly enlarged or tapered so as to ensure a tight normal fit for the sealing member and to facilitate movement of the receptacle assembly past the upper part of the cylinder.

The heat-exchanger obviously could have a cross-sectional shape other than circular, such as oval, or rectangular with rounded corners; the shape of the opening through the bottom of the receptacle, and of the sealing member, then being altered conformingly. Furthermore, the heat-exchanger, instead of being associated with refrigerating apparatus, could be simply a container for ice or solid carbon dioxide.

The specific embodiment of my invention herein shown and described is obviously susceptible of modification without departing from the spirit of the invention, and I intend therefore to be limited only by the scope of the appended claims.

I claim as my invention:

1. In an apparatus for cooling and dispensing beverages: a base; means for cooling the beverage comprising an elongated heat-exchanger projecting upward from said base; a removable bowl-like receptacle surrounding said heat-exchanger so that there is a continuous space therebetween for the beverage, said receptacle having an opening through its bottom somewhat larger than the heat-exchanger so that the receptacle can be removed for cleaning by lifting it from the rest of the apparatus and subsequently replaced by lowering it around the heat-exchanger; means projecting from said base for supporting the receptacle and limiting the lowering of the receptacle around the heat-exchanger; a member of elastic material attached to the receptacle and sealing the space between the heat-exchanger and the edge of said opening when the receptacle is in its supported position, said member having a sliding fit with the heat-exchanger; and means for preventing removal of said sealing member from the receptacle until the receptacle, together with the member, is out of engagement with the heat-exchanger.

2. The combination defined in claim 1, and wherein the means for preventing said removal of the sealing member comprises portions of the member forming a channel for receiving marginal portions of the receptacle adjoining said opening.

3. The combination defined in claim 1, and including dish-like means, mounted on said base and spaced below the bottom of said receptacle when the same is in said supported position, for receiving drippings from the heat-exchanger when the receptacle is removed.

4. In an apparatus for cooling and dispensing beverages: means for cooling the beverage comprising a vertically elongated heat-exchanger; a removable bowl-like receptacle surrounding said heat-exchanger so that there is a continuous space therebetween for the beverage, said receptacle having an opening through its bottom somewhat larger than the heat-exchanger; and a member of rubber-like elastic material sealing the space between the heat-exchanger and the edge of said opening, said member having portions forming a channel receiving and overlapping marginal portions of the bottom of the receptacle adjoining said opening so that removal of the member from the receptacle is prevented while the receptacle is in normal position around the heat-exchanger; said member having a sliding fit with the heat-exchanger so that the receptacle, together with the member, can be removed for cleaning by lifting it away from the heat-exchanger and subsequently replaced by lowering it to said normal position; said member being deformable to permit its removal from the receptacle only when the receptacle and member are removed from the heat-exchanger for cleaning.

5. The combination defined in claim 4, and wherein said heat-exchanger is cylindrical, said opening in the bottom of the receptacle is circular, and said sealing member is annular.

LLOYD E. RABJOHN.

References Cited in the file of this patent

UNITED STATES PATENTS

| Number | Name | Date |
| --- | --- | --- |
| 212,951 | Klinefelter | Mar. 4, 1879 |
| 848,228 | Ettel | Mar. 26, 1907 |
| 1,660,074 | Hagg | Feb. 21, 1928 |
| 1,800,975 | Abrams | Apr. 4, 1931 |
| 1,976,007 | Cullen | Oct. 9, 1934 |
| 2,069,374 | Lagomarsino | Feb. 2, 1937 |
| 2,376,373 | Merckel | May 22, 1945 |
| 2,504,916 | Zolot | Apr. 18, 1950 |